US011445376B2

(12) United States Patent
Aono et al.

(10) Patent No.: US 11,445,376 B2
(45) Date of Patent: Sep. 13, 2022

(54) SECURITY ESTABLISHMENT METHOD, TERMINAL DEVICE, AND NETWORK DEVICE

(71) Applicant: NTT DOCOMO, INC., Tokyo (JP)

(72) Inventors: Hiroshi Aono, Tokyo (JP); Alf Zugenmaier, Munich (DE)

(73) Assignee: NTT DOCOMO, INC., Tokyo (JP)

(*) Notice: Subject to any disclaimer, the term of this patent is extended or adjusted under 35 U.S.C. 154(b) by 159 days.

(21) Appl. No.: 16/753,933

(22) PCT Filed: Oct. 10, 2018

(86) PCT No.: PCT/JP2018/037791
§ 371 (c)(1),
(2) Date: Apr. 6, 2020

(87) PCT Pub. No.: WO2019/074014
PCT Pub. Date: Apr. 18, 2019

(65) Prior Publication Data
US 2020/0359203 A1 Nov. 12, 2020

(30) Foreign Application Priority Data
Oct. 10, 2017 (JP) .............................. JP2017-197108

(51) Int. Cl.
H04L 29/06 (2006.01)
H04W 12/50 (2021.01)
(Continued)

(52) U.S. Cl.
CPC ........... H04W 12/50 (2021.01); H04L 9/3073 (2013.01); H04W 12/041 (2021.01); H04W 12/43 (2021.01)

(58) Field of Classification Search
None
See application file for complete search history.

(56) References Cited

U.S. PATENT DOCUMENTS 11,128,985 B2 * 9/2021 Edge ..................... H04W 4/029
11,153,083 B2 * 10/2021 Velev .................... H04L 9/3297
(Continued)

OTHER PUBLICATIONS

ZTE, "Lightweight secure way for protecting anchor key transmitting—EAP-AKA", 3GPP TSG SA WG3, S3-171759, Aug. 7, 2017, p. 1-5. (Year: 2017).*

(Continued)

Primary Examiner — Jeffery L Williams
(74) Attorney, Agent, or Firm — Osha Bergman Watanabe & Burton LLP

(57) ABSTRACT

A security establishment method includes generating a pair of keys via mutual authentication between a terminal device (110) and a serving network, and the terminal device (110) and the serving network sharing $K_{ASME}$ by using the generated pair of keys (Steps S50 and S100), the terminal device (110) and a roaming destination network of the terminal device (110) generating, by using the $K_{ASME}$, $K_{SEAF}$ mapped with SEAF (50) (Steps S140 and S150), and the terminal device (110) and the roaming destination network generating, by using at least the $K_{SEAF}$ and SUPI used to recognize a subscriber in the serving network, $K_{AMF}$ mapped with AMF (60) (Steps S140 and S150).

3 Claims, 4 Drawing Sheets

(51) Int. Cl.
*H04L 9/30* (2006.01)
*H04W 12/041* (2021.01)
*H04W 12/43* (2021.01)

(56) References Cited

U.S. PATENT DOCUMENTS

| | | | | |
|---|---|---|---|---|
| 2013/0003971 | A1 | 1/2013 | Forsberg et al. | |
| 2013/0109347 | A1* | 5/2013 | Feng | H04L 63/062 455/411 |
| 2016/0127896 | A1* | 5/2016 | Lee | H04W 12/0431 455/411 |
| 2019/0053010 | A1* | 2/2019 | Edge | H04W 64/00 |
| 2020/0236536 | A1* | 7/2020 | Aono | H04W 12/041 |
| 2020/0259786 | A1* | 8/2020 | Saarinen | H04L 63/04 |
| 2020/0359203 | A1* | 11/2020 | Aono | H04W 12/40 |
| 2022/0007150 | A1* | 1/2022 | Edge | H04W 64/00 |

OTHER PUBLICATIONS

Office Action issued in the counterpart Canadian Patent Application No. 3,078,785, dated May 27, 2021 (5 pages).
Notice of Reasons for Refusal issued in Japanese Application No. 2019-548223, dated Mar. 9, 2021 (6 pages).
Extended European Search Report issued in counterpart European Patent Application No. 18865885.0, dated Oct. 12, 2020 (8 pages).
3GPP TS 33.401 V14.3.0 "3rd Generation Partnership Project; Technical Specification Group Services and System Aspects; 3GPP System Architecture Evolution (SAE); Security architecture (Release 14)" Jun. 2017 (153 pages).
3GPP TS 33.501 V0.3.0 "3rd Generation Partnership Project; Technical Specification Group Services and System Aspects; Security Architecture and Procedures for 5G System (Release 15)" Aug. 2017 (44 pages).
3GPP TR 33.899 V1.3.0 "3rd Generation Partnership Project; Technical Specification Group Services and System Aspects; Study on the security aspects of the next generation system (Release 14)" Aug. 2017 (604 pages).
3GPP TSG SA WG3 (Security) Meeting #88Bis Adhoc; S3-172488 "pCR to 33.501 6.1.3.1, 6.1.3.2—SUPI assurance in SEAF" NTT DOCOMO; Singapore; Oct. 9-13, 2017 (5 pages).
3GPP TSG SA WG3 (Security) Meeting #88Bis Adhoc; S3-172257 "pCR to TS 33.501: KDF Negotiation Procedure" Huawei, Hisilicon; Singapore; Oct. 9-13, 2017 (4 pages).
International Search Report issued in International Application No. PCT/JP2018/037791, dated Dec. 12, 2018 (5 pages).
Written Opinion issued in International Application No. PCT/JP2018/037791; dated Dec. 11, 2018 (4 pages).
Office Action issued in the counterpart European Patent Application No. 18865885.0, dated Jan. 21, 2022 (6 pages).

* cited by examiner

SECURITY ESTABLISHMENT METHOD, TERMINAL DEVICE, AND NETWORK DEVICE

TECHNICAL FIELD

The present invention relates to a security establishment method for establishing security of a terminal device with a subscriber identity module mounted therein. The present invention also relates to the terminal device and a network device.

BACKGROUND ART

3rd Generation Partnership Project (3GPP) specifies Long Term Evolution (LTE), and with the aim of further speeding, specifies LTE-Advanced (hereinbelow, the LTE includes the LTE-Advanced). Moreover, in the 3GPP, further, specification of a succeeding system of the LTE called 5G New Radio (NR) and the like is being considered.

In the LTE, to perform mutual authentication between a subscriber (terminal device) and a telecommunications carrier (may be called a serving network), Authentication and Agreement (AKA) is performed by using a subscriber identity (International Mobile Subscriber Identity (IMSI)) and a persistent key K (secret information) stored in a subscriber identity module (Universal Integrated Circuit Card (UICC)).

Moreover, whenever the AKA is performed, a key (CK, 1K) used for encryption and integrity assurance is generated, and this key is handed from the subscriber identity module (UICC) to the terminal device (ME) (see Non-Patent Document 1).

Furthermore, to protect from privacy violation by tracing of the subscriber identity (IMSI), mutual authentication is performed by using Temporary Mobile Subscriber Identity (TMSI) that is a temporary subscriber identity based on the IMSI. When the subscriber (terminal device) performs roaming, the IMSI and the TMSI are mapped wits each other in the roaming destination telecommunications carrier (may be called a roaming destination network).

In the NR, Subscription Permanent Identifier (SUPI) is prescribed as the subscriber identity, and enhancement of privacy protection of the subscriber identity is being considered (e.g., see Non-Patent Document 2).

PRIOR ART DOCUMENT

Non-Patent Document

Non-Patent Document 1: 3GPP TS 33.401 V14.3.0 Subclause 6.1.1 AKA procedure, 3rd Generation Partnership Project; Technical Specification Group Services and System Aspects; 3GPP System Architecture Evolution (SAE); Security architecture (Release 14), 3GPP, June 2017

Non-Patent Document 2: 3GPP TS 33.501 V0.3.0 Subclause 6.1.3 Authentication procedures, 3rd Generation. Partnership Project; Technical Specification Group Services and System Aspects; Security Architecture and Procedures for 5G System (Release 15), 3GPP, August 2017

SUMMARY OF THE INVENTION

In the NR, in comparison with the generations until the LTE, it is expected that the telecommunications carriers who provide the service will be diversified. In such an environment, even when the terminal device performs roaming from a telecommunications carrier with which the subscriber has a contract to a mobile communications network (VPLMN) of other telecommunications carrier, it is necessary to protect privacy of the subscriber identity (SUPI).

However, the telecommunications carrier who provides the HPLMN may not completely trust the telecommunications carrier who provides the VPLMN. Therefore, the telecommunications carrier who provides the HPLMN does not simply provide the SUPI, but provides the SUPI to the telecommunications carrier who provides the VPLMN only after performing authentication between the subscriber and the telecommunications carrier who provides the HPLMN.

On the other hand, when a lawful interception (Lawful Interception (LI)) is required in the roaming destination network, the roaming destination network must ensure legitimacy of secret information, without each time verifying the SUPI of the subscriber for the LI with the PLMN (HPLMN) of the subscriber, between the subscriber and the telecommunications carrier who provides the VPLMN.

The present invention has been made in view of the above discussion. One object of the present invention is to provide a security establishment method, a terminal device, and a network device capable of, after establishing security between the terminal device and a serving network, safely and easily providing subscriber identity (SUPI) to a roaming destination network, and acquiring secret information between a subscriber who is attached to a correctly provided SUPI and a telecommunications carrier who provides VPLMN.

A security establishment method according to one aspect of the present invention is a security establishment method of establishing a security of a terminal device (terminal device 110), in which a subscriber identity module (UICC 200) has been mounted, by using secret information (key K) stored in the subscriber identity module and a pair of keys consisting of an encryption key (key CK) and an integrity key (integrity key 1K) generated based on the secret information. The security establishment method includes generating the pair of keys via mutual authentication between the terminal device and a serving network (HPLMN 20); sharing (Steps S50 and S100) in which the terminal device and the serving network share a first temporary key ($K_{ASME}$) by using the pair of keys generated at, the generating; generating (Steps S140 and S150) in which the terminal device and a roaming destination network (VPLMN 30) of the terminal device generate, by using the first temporary key, a second temporary key ($K_{SEAF}$) mapped with a security anchor function (SERF 50) of the roaming destination network; and generating (Steps S140 and S150) in which the terminal device and the roaming destination network generate, by using at least the second temporary key and a subscriber identity (SUPI) used to recognize the subscriber in the serving network, a third temporary key ($K_{AMF}$) mapped with access and mobility administration function (AMF 60) of the roaming destination network.

A terminal device according to another aspect of the present invention is a terminal device (terminal device 110) in which a subscriber identity module used to recognize a subscriber can be mounted. The terminal device includes a first key generating unit ($K_{ASME}$ generating unit 130) that generates a first temporary key by using a pair of keys consisting of an encryption key and an integrity key generated based on secret information stored in the subscriber identity module; a second key generating unit ($K_{SEAF}$ generating unit 140) that generates, by using the first temporary key, a second temporary key mapped with a security anchor function of a roaming destination network of the terminal device; and a third key generating unit ($K_{AMF}$, generating unit 145) that generates, by using at least the second temporary key and a subscriber identity used to recognize the subscriber in a serving network, a third temporary key mapped with access and mobility administration function of the roaming destination network.

A network device according to still another aspect of the present invention is a network device (SEAF 50) capable of performing communication with a terminal device in which a subscriber identity module used to recognize a subscriber can be mounted. The network device includes a first key generating unit that generates a first temporary key by using a pair of keys consisting of an encryption key and an integrity key Generated based on secret information stored in the subscriber identity module; a second key generating unit that generates, by using the first temporary key, a second temporary key mapped with a security anchor function of a roaming destination network of the terminal device; and a third key generating unit that generates, by using at least the second temporary key and a subscriber identity used to recognize the subscriber in a serving network, a third temporary key mapped with access and mobility administration function of the roaming destination network.

MODES FOR CARRYING OUT THE INVENTION

Figure 1:
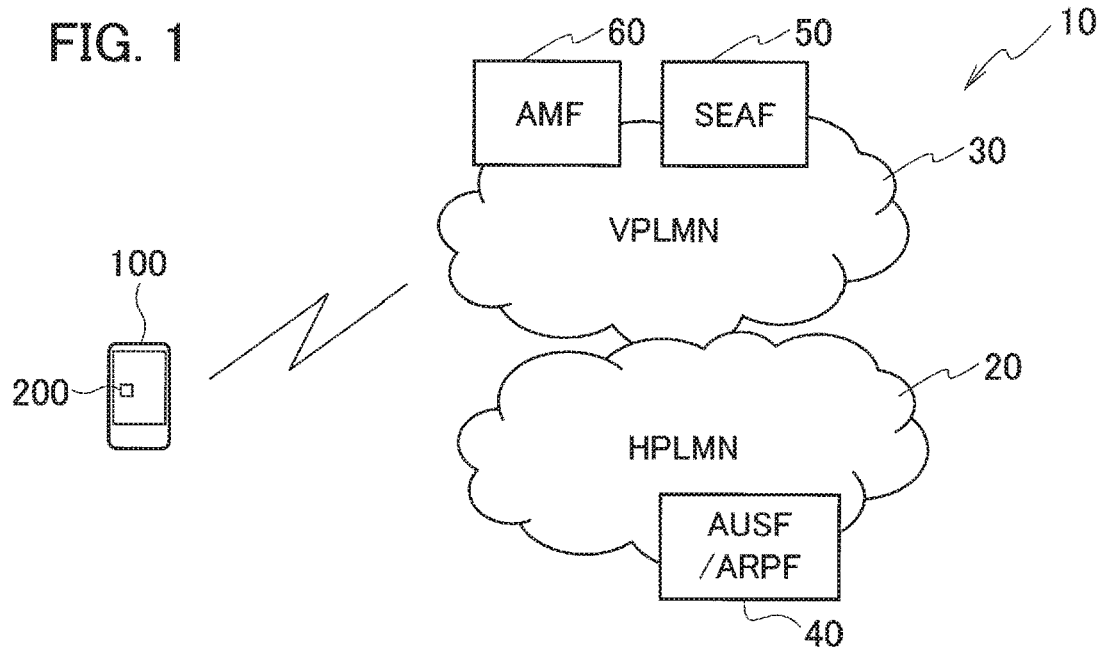
FIG. 1 is an overall structural diagram of a radio communication system 10.

Exemplary embodiments are explained below with reference to the accompanying drawings. In the drawings, structural elements having the same or similar functions or same or similar configuration are indicated by the same or similar reference numerals and the explanation thereof is appropriately omitted.

(1) Overall Structural Configuration of Radio Communication System

FIG. 1 is an overall structural diagram of a radio communication system 10 according to the present embodiment. The radio communication system 10 is a radio communication system in accordance with 5G New Radio (NR). The radio communication system 10 includes Home Public Land Mobile Network 20 (hereinafter, "HPLMN 20") and Visited Public Land Mobile Network 30 (hereinafter, "VPLMN 30").

A user device (user equipment) 100 (hereinafter, "UE 100") has access to both the HPLMN 20 and the VPLMN 30. The UE 100 performs radio communication with a radio base station (not-shown gNB) included in the HPLMN 20 and a radio base station (not-shown gNB) included in the VPLMN 30.

The UE 100 can include Universal Integrated Circuit Card 200 hereinafter, "UICC 200").

The UICC 200 stores therein information such as content of the contract made with the telecommunications carrier who provides the HPLMN 20. Specifically, the UICC 200 stores therein a key K (secret information) that is a persistent key, a subscriber identity (Subscription Permanent Identifier (SUPI)) for recognizing the subscriber, and the like.

The HPLMN 20 includes Authentication Server Function/ Authentication Credential Repository and Processing Function 40 (hereinafter, "AUSF/ARPF 40"). Moreover, the VPLMN 30 includes SEcurity Anchor Function 50 (hereinafter, "SEAF 50") and Access and Mobility Management Function 60 (hereinafter, "AMF 60").

The AUSF/ARPF 40 and the SEAF 50, based on a request from the UE 100 that performed the roaming to the VPLMN 30, perform an authentication processing of the UE 100 between the AUSF/ARPF 40 and the SEAF 50.

The SEAF 50 provides a security anchor function in the VPLMN 30. The AMF 60 manages access and mobility to the VPLMN 30 of the UE 100. That is, the AMF 60 provides access and mobility administration function.

Note that, in the present embodiment, the SEAF 50 constitutes a network device that performs communication with the UE 100 (specifically, the later-explained terminal device 110).

(2) Functional Block Configuration of Radio Communication System

Figure 2:
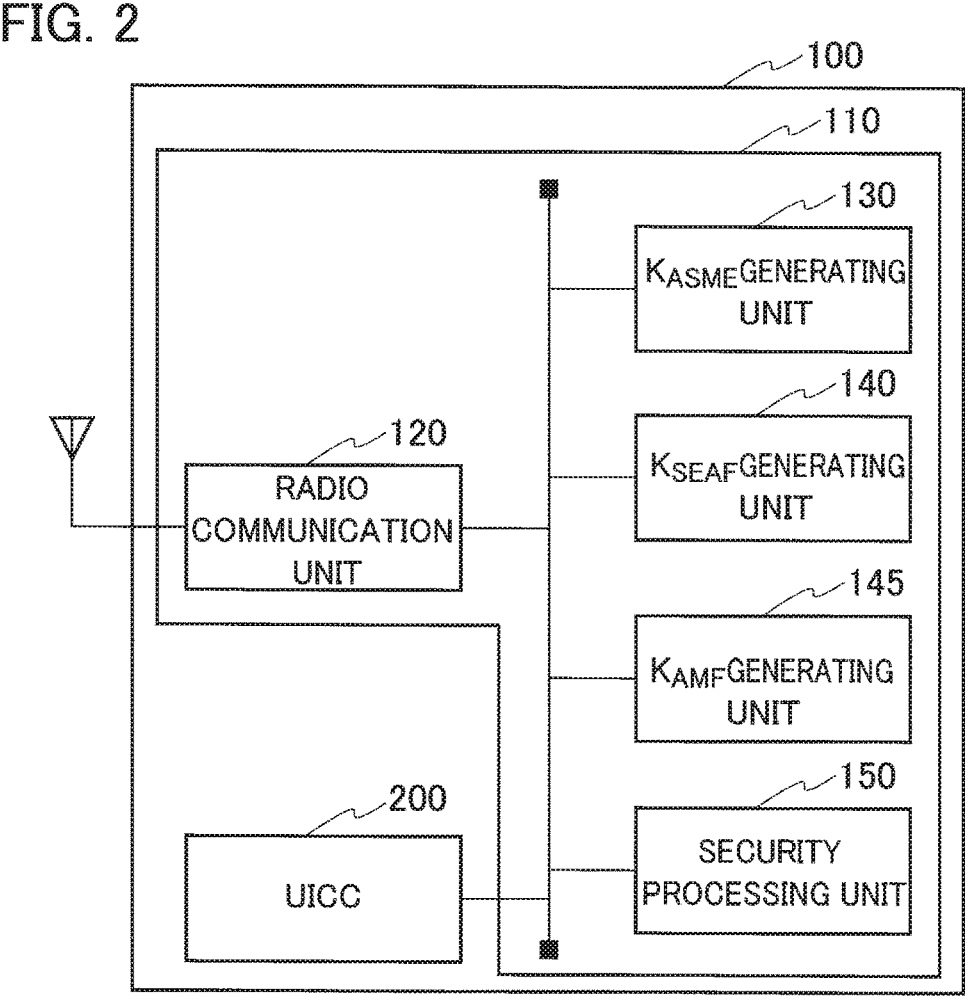
FIG. 2 is a functional block diagram of UE 100.

A functional block configuration of the radio communication system 10 is explained below. Specifically, a functional block configuration of the UE 100 is explained. FIG. 2 is a functional block diagram of the UE 100.

As shown in FIG. 2, the UE 100 includes the terminal device 110 and the UICC 200. The terminal device 110 includes basic hardware, firmware, software, applications, and the like of the UE 100 that are not included in the UICC 200. In the technical standard of the 3GPP, the terminal device 110 is prescribed as Mobile Equipment (ME). That is, the UICC 200 that recognizes a subscriber can be mounted in the terminal device 110, and when the UICC 200 is mounted in the terminal device 110, the terminal device 110 functions as the UE 100.

The terminal device 110 includes, as functional units, a radio communication unit 120, $K_{ASME}$ generating unit 130, $K_{SEAF}$ generating unit 140, and a security processing unit 150. Note that, the SEAF 50 (network device) includes similar functions as the $K_{ASME}$ generating unit 130 and the $K_{SEAF}$ generating unit 190.

The radio communication unit. 120 performs radio communication in accordance with NR system. Specifically, the radio communication unit 120 transmits and receives radio signals to and from the radio base station (gNB) in accordance with the NR system. User data or control data are multiplexed in the radio signal.

The $K_{ASME}$, generating unit 130 generates $K_{ASME}$ (first temporary key) that is a temporary key that cannot be used permanently. Note that, ASME is abbreviation of Access Security Management Entity.

Specifically, the $K_{ASME}$ generating unit 130 generates the $K_{ASME}$ by using a pair of keys, consisting of an encryption key CK and an integrity key IK, generated based on the key K stored in the UICC 200.

Figure 4:
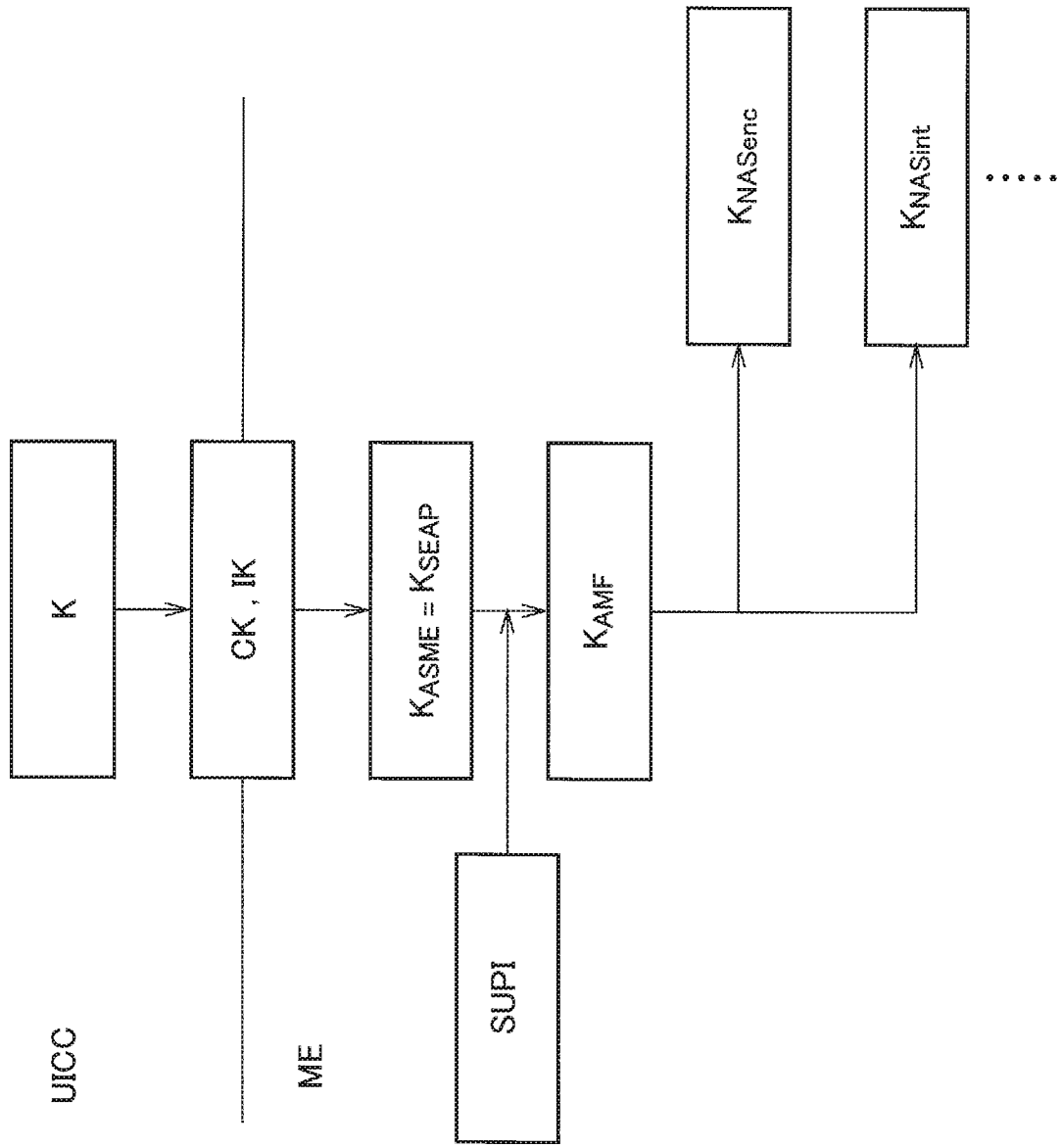
FIG. 4 is a view showing a key hierarchy used in the radio communication system 10.

FIG. 4 is a view showing a key hierarchy used in the radio communication system 10. As shown in FIG. 4, the key K is shared beforehand between the UICC 200 and AuC (not-shown Authentication Center) of the serving network (HPLMN 20) side, and whenever the Authentication and Key Agreement (AKA) is performed, the encryption key CK and the integrity key IK are generated.

The terminal device 110 (ME) uses a key generation function based on an identifier (SNID) of the serving network to generate the $K_{ASME}$ from the encryption key CK and the integrity key IK. Such a method of generating the $K_{ASME}$ is similar to the method of generating $K_{ASME}$ in the LTE system (see TS 33.401 Chapter 6.1.1).

The $K_{SEAF}$ generating unit 140 generates $K_{SEAF}$ (second temporary key) that is a temporary key like the $K_{ASME}$. Specifically, the $K_{SEAF}$ generating unit 140 generates the $K_{SEAF}$ mapped with the SEAF 50 (security anchor function).

In the present embodiment, the $K_{SEAF}$ generating unit 140 generates, as the $K_{SEAF}$, the $K_{ASME}$ generated by the $K_{ASME}$ generating unit 130. That is, the $K_{SEAF}$ generating unit 140 uses the $K_{ASME}$ as the $K_{SEAF}$ (second temporary key) mapped with the security anchor function.

A $K_{AMF}$ generating unit 145 generates $K_{AMF}$ (third temporary key) that is a temporary key like the $K_{ASME}$ and the $K_{SEAF}$. Specifically, the $K_{AMF}$ generating unit 145 generates the $K_{AMF}$ mapped with the AMF 60 (access and mobility administration function) by using at least the $K_{SEAF}$ and the SUPI (subscriber identity) used to recognize a subscriber in the serving network.

As shown in FIG. 4, the terminal device 110 (ME) inputs the $K_{SEAF}$ ($=K_{ASME}$) and the SUPI into Key Derivation Function (KDF) to generate the $K_{AMF}$. As explained later, the $K_{AMF}$ is shared between the UE 100 and the VPLMN 30 (specifically, the SEAF 50). In the same manner as the terminal device 110 does, the SEAF 50 generates the $K_{AMF}$ by using the KDF.

As shown in FIG. 4, the $K_{AMF}$ is used to generate a key $K_{NASenc}$ used to encrypt Non-Access Stratum (NAS) protocol between the UE 100 and the network side, and a key $K_{NASint}$ used for the integrity assurance.

The $K_{AMF}$ generating unit 145 can use, not only the $K_{SEAF}$ and the SUPI, but an additional parameter to generate the $K_{AMF}$. Specifically, the $K_{AMF}$ generating unit 145 generates the $K_{AMF}$ by using the $K_{SEAF}$, the SUPI, and information indicating the capability of the SEAF 50. Note that, as the information indicating the capability of the SEAF 50, the capability relating to communication, so-called SEAF capabilities, a version, presence or absence of support for a specific function, and the like can be listed.

Alternatively, the $K_{AMF}$ generating unit 145 can generate the $K_{AMF}$ by using the $K_{SEAF}$, the SUPI, and number of feature sets (Feature Set) of the terminal device 110 in which the UICC 200 is mounted. Note that, the feature set of the terminal device 110 is a type of version number and can be called FeatureSetUE and can be expressed as m=1, 2, . . . , and the like.

The security processing unit 150 performs security processing with the network (HPLMN 20 or VPLMN 30) by using the above-mentioned keys and the like. That is, the security processing unit 150 establishes the security between the terminal device 110 and the network by using the key K and the pair of keys consisting of the encryption key CK and the integrity key IK.

Specifically, the security processing unit 150 encrypts the SUPI and generates Subscription Concealed Identifier (SUCI). The security processing unit 150 transmits N1 message containing the SUCI (encryption identifier) to the network.

Furthermore, the security processing unit 150 performs acts such as transmitting an authentication request (Authentication Request) to the network and receiving an authentication response (Authentication Response) transmitted from the network.

(3) Operation of Radio Communication System

An operation of the radio communication system 10 is explained below. Specifically, an authentication procedure of the subscriber identity (SUPI) when the UE 100 performs roaming to the VPLMN 30 is explained.

Figure 3:
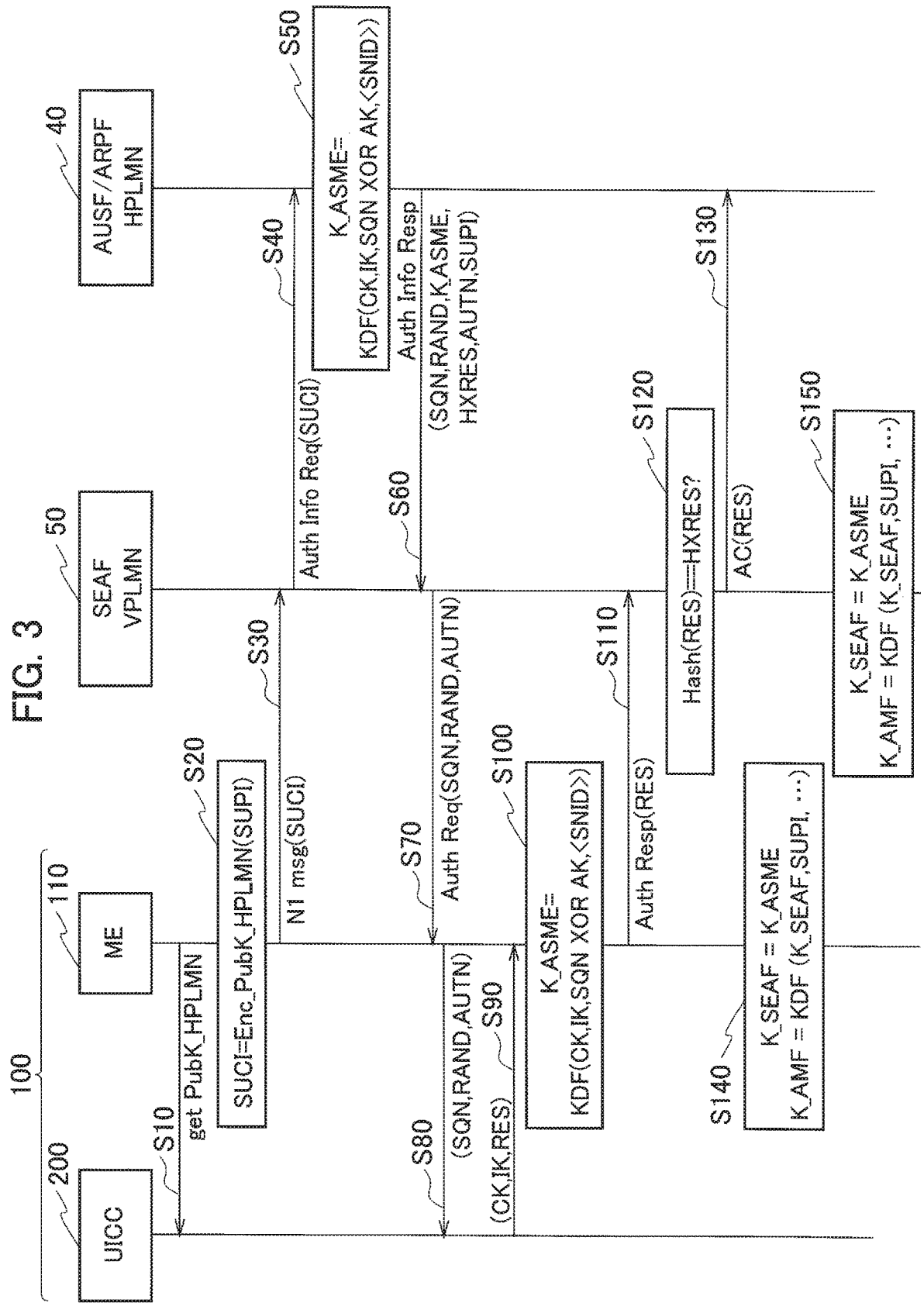
FIG. 3 is a view showing a generation and sharing sequence of temporary keys ($K_{ASME}$, $K_{SEAF}$, and $K_{AMF}$) when the UE 100 performs roaming to VPLMN 30.

FIG. 3 is a view showing a generation and sharing sequence of the temporary keys ($K_{ASME}$, $K_{SEAF}$, and $K_{AMF}$) when the UE 100 performs roaming to the VPLMN 30. In this example, it is assumed that the UE 100 performed roaming to the VPLMN 30.

As shown in FIG. 3, the UICC 200 acquires a public key (PubK) of the HPLMN 20 from the terminal device 110 (ME) (Step S10).

The terminal device 110 encrypts the SUPI by using the PubK and generates the SUCI (Step S20). Moreover, the terminal device 110 transmits to the SEAF 50 in the VPLMN 30 the N1 message containing the generated SUCI (Step S30).

The SEAF 50 transmits to the AUSF/ARPF 40 in the HPLMN 20 an authentication information request (Authentication Information Request) containing the received SUCI (Step S40).

The AUSF/ARPF 40 inputs the encryption key CK, the integrity key IK, a sequence number (SQN), Anonymity Key (AK), and the identifier (SNID) of the serving network into the Key Derivation Function (KDF) and generates the $K_{ASME}$ (Step S50). Note that, in FIG. 3, for the sake of representation, the $K_{ASME}$ is shown as K_ASME.

The AUSF/ARPF 40 transmits to the SEAF 50 the $K_{ASME}$, the SQN, a random number (RAND), Expected Response (HXRES), an authentication token (AUTN), and an authentication information response (Authentication Information Response) containing the SUPI (Step S60).

The SEAF 50 transmits to the terminal device 110 the authentication request (Authentication Request) containing the SQN, the RAND, and the AUTN (Step S70).

The terminal device 110 transmits to the UICC 200 the SQN, the RAND, and the AUTN contained in the authentication request (Step S80).

The UICC 200 performs the AKA based on the received SQN, RAND, and AUTN, and transmits the encryption key CK, the integrity key IK, and Response (RES) to the terminal device 110 (Step S90).

The terminal device 110 inputs the encryption key CK, the integrity key IK, the SQN, the AK, and the SNID into the KDF and generates the $K_{ASME}$ (Step S100).

In this manner, the pair of keys (the encryption key CK and the integrity key IK) is generated via the mutual authentication between the terminal device 110 and the serving network (HPLMN 20), and the terminal device 110 and the serving network share the $K_{ASME}$ (first temporary key) by using the generated pair of keys.

The terminal device 110 transmits to the SEAF 50 the authentication response (Authentication Response) in response to the authentication request (Step S110). The authentication response includes the RES received from the UICC 200.

The SEAF 50 confirms whether the HXRES matches with the RES received from the terminal device 110 (Step S120). When the HXRES matches with the RES, the SEAF 50 transmits to the AUSF/ARPF 40 an authentication confirmation (Authentication Confirmation) containing the RES (Step S130).

Then, the terminal device 110 generates the $K_{SEAF}$ (second temporary key) by using the $K_{ASME}$ and further generates the $K_{AMF}$ (third temporary key) (Step S140). Note that, in FIG. 3, for the sake of representation, the $K_{SEAF}$ and the $K_{AMF}$ are shown as K_SEAF and K_AMF respectively.

Specifically, the terminal device 110 generates the security anchor function of the roaming destination network, that is, the $K_{SEAF}$ (second temporary key) mapped with the AMF 60, by using the $K_{ASME}$ generated at Step S100. As mentioned earlier, in the present embodiment, the terminal device 110 uses the $K_{ASME}$ as the $K_{SEAF}$ (second temporary key) mapped with the security anchor function.

The terminal device 110 generates the $K_{AMF}$ mapped with the access and mobility administration function (specifically, the AMF 60) of the roaming destination network by using at least the $K_{SEAF}$ and the SUPI used to recognize a subscriber in the serving network (HPLMN 20). Specifically, the terminal device 110 inputs the $K_{SEAF}$ and the SUPI into the KDF and generates the $K_{AMF}$.

Note that, as indicated by " . . . " in K_AMF=(K_SEAF, SUPI, . . . ), the terminal device 110 can generate the $K_{AMF}$, not only by using the $K_{SEAF}$ and the SUPI, but also by using other information of the SEAF 50 such as the SEAF capabilities.

Similarly, the roaming destination network, specifically, the SEAF 50, generates the $K_{SEAF}$, and inputs the $K_{SEAF}$ and the SUPI into the KDF and generates the $K_{AMF}$ (Step S150).

Note that, as indicated by " . . . " in K_AMF=(K_SEAF, SUPI, . . . ), the SEAF 50 also can generate the $K_{AMF}$, not only by using the $K_{SEAF}$ and the SUPI, but also by using other information of the SEAF 50 such as the SEAF capabilities.

In this manner, the terminal device 110 generates the $K_{AMF}$ by using the $K_{SEAF}$ and the SUPI used for recognizing a subscriber in the serving network (HPLMN 20). Moreover, the roaming destination network (specifically, the SEAF 50) of the terminal device 110 generates the $K_{AMF}$ by using the $K_{SEAF}$ notified from the serving network and the SUPI. Accordingly, the roaming destination network shares the $K_{SEAF}$ and the $K_{AMF}$ with the terminal device 110.

Moreover, only upon succeeding the authentication between the terminal device 110 and the serving network, the roaming destination network acquires the SUPI and can acquire the $K_{AMF}$ from the acquired SUPI.

Note that, the SEAF 50 can acquire the SUPI from the SUCI acquired at Step S30. In this manner, prior to sharing the $K_{SEAF}$ and the $K_{AMF}$, the terminal device 110 provides the SUCI (encryption identifier), which is the encrypted SUPI, to the roaming destination network (SEAF 50).

(4) Effects and Advantages

With the present embodiment, the following effects and advantages can be obtained. Specifically, in the present embodiment, each of the terminal device 110 and the VPLMN 30 generates the $K_{AMF}$ by using the $K_{SEAF}$ (=$K_{ASME}$) and the SUPI. Therefore, the VPLMN 30 (SEAF 50) can safely acquire the $K_{SEAF}$ and the $K_{AMF}$ by using only the SUPI of the UE 100 (subscriber) for which the mutual authentication is successful.

That is, the HPLMN 20 (AUSF/ARPF 40) need not provide the SUPI as is to the VPLMN 30 until the authentication with the subscriber succeeds. Thus, while maintaining the privacy protection of the subscriber, the HPLMN 20 can achieve a very high level of security for the secret information between a subscriber who is attached to the correctly provided SUPI and the telecommunications carrier who provides the VPLMN 30.

That is, in the present embodiment, after having established the security between the terminal device 110 and the HPLMN 20, the SUPI of the subscriber can be safely and easily provided to the VPLMN 30.

In the present embodiment, the terminal device 110 and the SEAF 50 can generate the $K_{AMF}$ by using, not only the $K_{SEAF}$ and the SUPI, but also other information of the SEAF 50 such as the SEAF capabilities, or the feature set of the terminal device 110 or the feature set of the SEAF 50. Therefore, the terminal device 110 can perform the processing and the like depending on the functions supported by the SEAF 50. Similarly, because a version of the function supported by the terminal device 110 can be extracted from the $K_{AMF}$, the SEAF 50 can perform the processing and the like depending on the functions supported by the terminal device 110.

In the present embodiment, the terminal device 110 and the VPLMN 30 share the $K_{SEAF}$ and the $K_{AMF}$, and the VPLMN 30 can acquire the $K_{SEAF}$ and the $K_{AMF}$ from the SUPI of the correct subscriber without checking with the HPLMN 20. Therefore, when lawful interception (Lawful Interception (LI)) is required to be performed in the VPLMN 30, the LI of the subscriber can be performed safely and easily in the VPLMN 30.

In the present embodiment, the terminal device 110 provides the SUCI, which is the encrypted SUPI, to the VPLMN 30 (SEAF 50) prior to sharing the $K_{SEAF}$ and the $K_{AMF}$ with the VPLMN 30. Therefore, only upon succeeding in the authentication between the subscriber and the HVPLMN, the VPLMN 30 can acquire the SUPI from the SUCI and share with the terminal device 110 the $K_{SEAF}$ and the $K_{AMF}$ attached to this SUPI. Accordingly, the VPLMN 30 can safely and easily acquire the $K_{SEAF}$ and the $K_{AMF}$ attached to the SUPI of the subscriber.

(5) Other Embodiments

The present invention has been explained in detail by using the above-mentioned embodiments; however, it is self-evident to a person skilled in the art that the present invention is not limited to the embodiments explained herein and that the embodiments can be modified or improved in various ways.

For example, an embodiment in which the $K_{SEAF}$ and the $K_{AMF}$ are shared between the HPLMN 20 and the VPLMN 30 is explained above; however, such sharing of the $K_{SEAF}$ and the $K_{AMF}$ is not necessarily limited to the HPLMN and the VPLMN. It is sufficient that the HPLMN 20 is a network (serving network) with which the subscriber of the UE 100 has a contract, and the VPLMN 30 is a network (roaming destination network) with which the subscriber has no direct contract, that is, a network that does not have the SUPT that is allocated by the telecommunications carrier.

Moreover, the block diagram used for explaining the embodiments (FIG. 2) shows functional blocks. Those functional blocks (structural components) can be realized by a desired combination of hardware and/or software. Means for realizing each functional block is not particularly limited. That is, each functional block may be realized by one device combined physically and/or logically. Alternatively, two or more devices separated physically and/or logically may be directly and/or indirectly connected (for example, wired and/or wireless) to each other, and each functional block may be realized by these plural devices.

Figure 5:
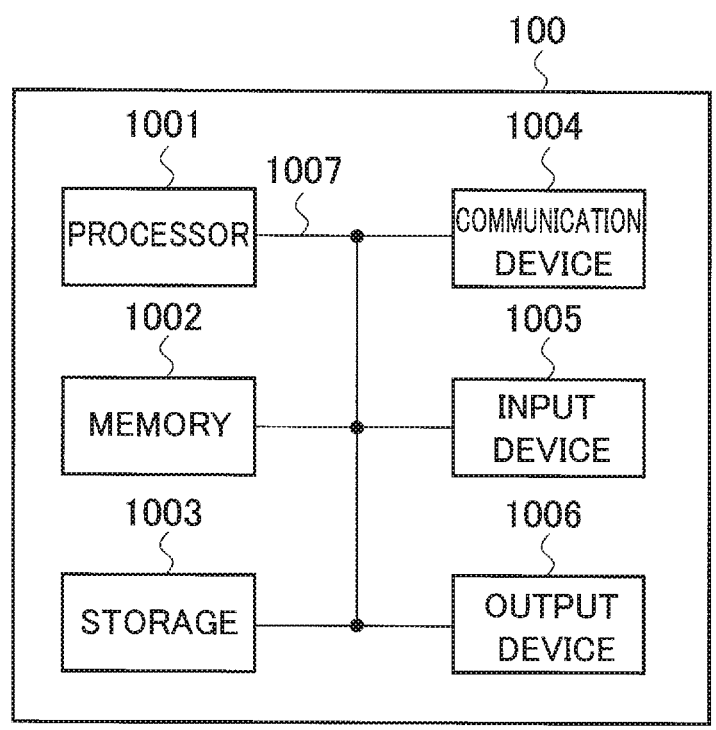
FIG. 5 is a view showing an example of hardware configuration of the UE 100.

Furthermore, the UE 100 (terminal device 110) explained above can function as a computer that performs the processing of the present invention. FIG. 5 is a diagram showing an example of a hardware configuration of the UE 100. As shown in FIG. 5, the UE 100 can be configured as a computer device including a processor 1001, a memory 1002, a storage 1003, a communication device 1004, an input device 1005, an output device 1006, and a bus 1007.

The functional blocks of the UE 100 (see FIG. 2) can be realized by any of hardware elements of the computer device or a desired combination of the hardware elements.

The processor 1001, for example, operates an operating system to control the entire computer. The processor 1001 can be configured with a central processing unit (CPU) including an interface with a peripheral device, a control device, a computing device, a register, and the like.

The memory 1002 is a computer readable recording medium and is configured, for example, with at least one of ROM (Read Only Memory), EPROM (Erasable Programmable ROM), EEPROM (Electrically Erasable Programmable ROM), RAM (Random Access Memory), and the like. The memory 1002 can be called register, cache, main memory (main memory), and the like. The memory 1002 can store therein a computer program (computer program codes), software modules, and the like that can execute the method according to the above embodiments.

The storage 1003 is a computer readable recording medium. Examples of the storage 1003 include an optical disk such as CD-ROM (Compact Disc ROM), a hard disk drive, a flexible disk, a magneto-optical disk (for example, a compact disk, a digital versatile disk, a Blu-ray (Registered Trademark) disk), a smart card, a flash memory (for example, a card, a stick, a key drive), a floppy (Registered Trademark) disk, a Magnetic strip, and the like. The storage 1003 can be called an auxiliary storage device. The recording medium can be, for example, a database including the memory 1002 and/or the storage 1003, a server, or other appropriate medium.

The communication device 1004 is hardware (transmission/reception device) capable of performing communication between computers via a wired and/or wireless network. The communication device 1004 is also called, for example, a network device, a network controller, a network card, a communication module, and the like.

The input device 1005 is an input device (for example, a keyboard, a mouse, a microphone, a switch, a button, a sensor, and the like) that accepts input from the outside. The output device 1006 is an output device (for example, a display, a speaker, an LED lamp, and the like) that outputs data to the outside. Note that, the input device 1005 and the output device 1006 may be integrated (for example, a touch screen).

In addition, the respective devices, such as the processor 1001 and the memory 1002, are connected to each other with the bus 1007 for communicating information there among. The bus 1007 can be constituted by a single bus or can be constituted by separate buses between the devices.

In addition the manner of notification of information is not limited to the one explained in the embodiments, and the notification may be performed in other manner. For example, the notification of information can be performed by physical layer signaling (for example, DCI (Downlink Control Information), UCI (Uplink Control Information)), upper layer signaling (for example, RRC signaling, MAC (Medium Access Control) signaling, notification information (MIB (Master Information Block), SIB (System Information Block)) other signals, or a combination thereof. In addition, the RRC signaling can be called an RRC message, and the RRC signaling can be, for example, an RRC Connection Setup message, an RRC Connection Reconfiguration message, and the like.

Furthermore, the input/output information can be stored in a specific location (for example, a memory) or can be managed in a management table. The information to be input/output can be overwritten, updated, or added. The information can be deleted after outputting. The inputted information can be transmitted to another device.

The order of the sequences, flowcharts, and the like in the embodiments can be rearranged unless there is a contradiction.

Moreover, in the embodiments explained above, the specific operations performed by the AUSF/ARPF 40 or the SEAF 50 can be performed by another network node (device). Moreover, functions of the AUSF/ARPF 40 or the SEAF 50 can be provided by combining a plurality of other network nodes.

Moreover, the terms used, in this specification and/or the terms necessary for understanding the present specification can be replaced with terms having the same or similar meanings. For example, a channel and/or a symbol can be replaced with a signal (signal) if that is stated. Also, the signal can be replaced with a message. Moreover, the terms "system" and "network" can be used interchangeably.

Furthermore, the used parameter and the like can be represented by an absolute value, can be expressed as a relative value from a predetermined value, or can be represented by corresponding other information. For example, the radio resource can be indicated by an index.

The gNB (base station) can accommodate one or more (for example, three) cells (also called sectors). In a configuration in which the base station accommodates a plurality of cells, the entire coverage area of the base station can be divided into a plurality of smaller areas. In each such a smaller area, communication service can be provided by a base station subsystem (for example, a small base station for indoor use RRH: Remote Radio Head).

The term "cell" or "sector" refers to a part or all of the coverage area of a base station and/or a base station subsystem that performs communication service in this coverage. In addition, the terms "base station" "eNB", "cell", and "sector" can be used interchangeably in the present specification. The base station can also be referred to as a fixed station, NodeB, eNodeB (eNB), gNodeB (gNB), an access point, a femtocell, a small cell, and the like.

The UE 100 is called by the persons skilled in the art as a subscriber station, a mobile, unit, a subscriber unit, a radio unit, a remote unit, a mobile device, a radio device, a radio communication device, a remote device, a mobile subscriber station, an access terminal, a mobile terminal, a radio terminal, a remote terminal, a handset, a user agent, a mobile client, a client, or with some other suitable term.

As used herein, the phrase "based on" does not mean "based only on" unless explicitly stated otherwise. In other words, the phrase "based on" means both "based only on" and "based at least on".

Furthermore, the terms "including", "comprising", and variants thereof are intended to be inclusive in a manner similar to "having". Furthermore, the term "or" used in the specification or claims is intended not to be an exclusive disjunction.

Any reference to an element using a designation such as "first", "second", and the like used in the present specification generally does not limit the amount or order of those elements. Such designations can be used in the present specification as a convenient way to distinguish between two or more elements. Thus, the reference to the first and second elements does not imply that only two elements can be adopted, or that the first element must precede the second element in some or the other manner.

Throughout the present specification, for example, during translation, if articles such as a, an, and the in English are added, these articles shall include plurality, unless it is clearly indicated that it is not so according to the context.

As described above, the details of the present invention have been disclosed by using the embodiments of the present invention. However, the description and drawings which constitute part of this disclosure should not be interpreted so as to limit the present invention. From this disclosure, various alternative embodiments, examples, and operation techniques will be apparent to a person skilled in the art.

EXPLANATION OF REFERENCE NUMERALS

10 Radio communication system
20 HPLMN
30 VPLMN
40 AUSF/ARPF
50 SEAF
60 AMF
100 UE
110 Terminal device
120 Radio communication unit
130 $K_{ASME}$ generating unit
140 $K_{SEAF}$ generating unit
145 $K_{AMF}$ generating unit
150 Security processing unit
200 UICC
1001 Processor
1002 Memory
1003 Storage
1004 Communication device
1005 Input device
1006 Output device
1007 Bus

The invention claimed is:

1. A security establishment method of establishing a security of a terminal device, in which a subscriber identity module used to recognize a subscriber has been mounted, by using secret information stored in the subscriber identity module and a pair of keys consisting of an encryption key and an integrity key generated based on the secret information, the security establishment method comprising:
generating the pair of keys via mutual authentication between the terminal device and a serving network;
sharing in which the terminal device and the serving network share a first temporary key by using the pair of keys generated at the generating;
acquiring in which the terminal device and a roaming destination network of the terminal device acquire a second temporary key mapped with a security anchor function of the roaming destination network, the second temporary key being generated by using the first temporary key; and
generating a third temporary key mapped with access and mobility administration function of the roaming destination network, in which the terminal device and the roaming destination network:
input, into a Key Derivation Function (KDF), the second temporary key and a subscription permanent identifier (SUPI) used to recognize the subscriber in the serving network; and
generate the third temporary key, by using at least:
the second temporary key;
the SUPI; and
information of capabilities or a feature set of the security anchor function of the roaming destination.

2. A terminal device in which a subscriber identity module used to recognize a subscriber can be mounted, the terminal device comprising:
a first key generating unit that generates a first temporary key by using a pair of keys consisting of an encryption key and an integrity key generated based on secret information stored in the subscriber identity module;
a second key generating unit that generates, by using the first temporary key, a second temporary key mapped with a security anchor function of a roaming destination network of the terminal device; and
a third key generating unit that:
inputs, into a Key Derivation Function (KDF), the second temporary key and a subscription permanent identifier (SUPI) used to recognize the subscriber in the serving network; and
generates a third temporary key mapped with access and mobility administration function of the roaming destination network, by using at least:
the second temporary key;
the SUPI; and
information of capabilities or a feature set of the security anchor function of the roaming destination.

3. A network device capable of performing communication with a terminal device in which a subscriber identity module used to recognize a subscriber can be mounted, the network device comprising:
a first key generating unit that generates a first temporary key by using a pair of keys consisting of an encryption key and an integrity key generated based on secret information stored in the subscriber identity module;
a second key generating unit that generates, by using the first temporary key, a second temporary key mapped with a security anchor function of a roaming destination network of the terminal device; and
a third key generating unit that:
inputs, into a Key Derivation Function (KDF), the second temporary key and a subscription permanent identifier (SUPI) used to recognize the subscriber in the serving network; and
generates a third temporary key mapped with access and mobility administration function of the roaming destination network, by using at least:
the second temporary key;
the SUPI; and
information of capabilities or a feature set of the security anchor function of the roaming destination.

* * * * *